United States Patent Office 3,194,828
Patented July 13, 1965

3,194,828
2,3(ALKYL MERCAPTO)PROPYL ESTERS OF PHOSPHINOTHIOIC AND PHOSPHONOTHIOIC ACIDS
Gerhard Schrader, Wuppertal-Cronenberg, Walter Lorenz, Wuppertal-Vohwinkel, and Hans-Gerd Schicke, Wuppertal-Elberfeld, Germany, assignors to Farbenfabriken Bayer Aktiengesellschaft, Leverkusen, Germany, a German corporation
No Drawing. Filed Aug. 16, 1960, Ser. No. 49,823
Claims priority, application Germany, Aug. 21, 1959, F 29,219; Sept. 5, 1959, F 29,320
13 Claims. (Cl. 260—461)

The present invention relates to and has as its objects new and useful insecticidal thio-phosphoric, -phosphonic or phosphinic acid esters and processes for their production. Generally the new compounds of the present invention may be represented by the following formula:

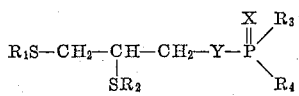

In this formula $R_1$ and $R_2$ stand for lower alkyl- radicals, $R_3$ and $R_4$ stand for lower alkoxy groups or lower alkyl groups and X and Y stand for oxygen or sulfur, the lower alkyl and lower alkoxy having in each case up to 4 carbon atoms.

Certain alkyl-mercapto-alkyl esters of phosphoric acids are already known to be very active insecticides or generally pesticides. There is however need for compounds in this field which are efficient against special pests or insects which in the meantime become resistant against attack of other insecticidal thiophosphoric acid esters.

It has now been found that the compounds of the above shown formula, which represent such a class of highly active compounds, may be prepared in various ways known in principle. Thus, if thiono-esters or thiono-thiol-esters are wanted corresponding suitably substituted 2,3-dimercapto propanols or mercaptanes are reacted with suitable thio-phosphoric, -phosphonic or -phosphinic acid halides as it may be seen from the following equation:

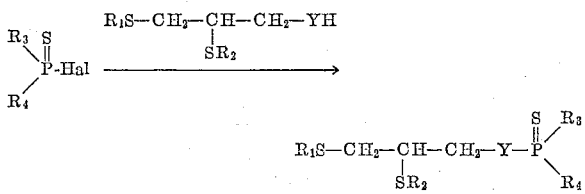

If thiol-esters should be prepared either corresponding phosphoric, phosphonic or phosphinic acid halides may be reacted with suitably substituted 2,3-dimercapto propyl mercaptanes or suitable salts of thio-phosphoric, -phosphonic or -phosphinic acids may be reacted with suitably substituted 2,3-dimercapto to propyl halides. This reaction may be shown by the following formulae:

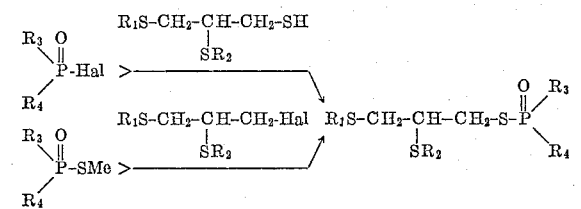

Dithio compounds also may be obtained by reacting salts of suitable dithio-phosphoric, -phosphonic or -phosphinic acids with suitable substituted 2,3-dimercapto-propyl-halides. This reaction may be shown by the following equation:

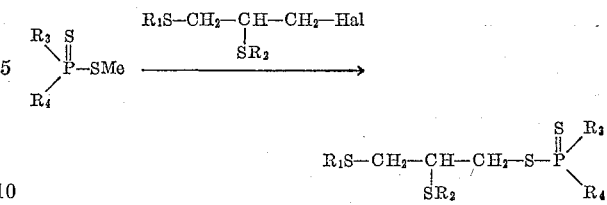

In the above equations the symbols $R_1$, $R_2$, $R_3$ and $R_4$ have the same significance as given in the first formula.

The new compounds of the present invention very effectively kill insects like flies, mites, aphids, etc. They distinguish themselves especially by a good contact-insecticidal activity and at the same time by an activity on eating insects such as caterpillars. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae (I) 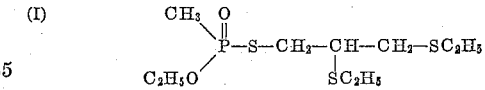

(II) 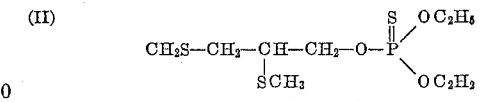

have been tested against spider mites and aphids. Aqueous solutions of the aformentioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(A) Against spider mites: bean plants (*Phaseolus vulgaris*) of about 15 inches height are sprayed drip wet with solutions prepared as indicated above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.001 | 100 |
| (II) | 0.01 | 100 |

(B) Against aphids of the type *Doralis fabae*: heavily infested bean plants (*Vicia faba*) have been sprayed drip wet with solutions as prepared above in a concentration as shown below. The effect has been determined after 24 hours by counting the dead pests either on the surface of the soil or still remaining on the plants. The following results have been obtained:

| Compound | Aqueous concentration (in percent active ingredient/water) | Killing rate (in percent) |
| --- | --- | --- |
| (I) | 0.001 | 100 |
| (II) | 0.01 | 100 |

The following examples are given for the purpose of illustrating the invention and show the great variety of the proces claimed herein.

Example 1

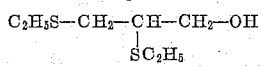

900 grams finely pulverized unhydrous potassium ethylmercaptan are suspended in 3500 ml. of dry benzene. At 70°–80° C. there is added while stirring a solution of 1000 grams 2,3-dibromo-propanol in 500 ml. benzene. The mixture is kept for 2 hours at 80° C., then cooled to room temperature and stirred for further 10 hours.

The reaction product is washed with water, then dryed over unhydrous sodium-sulfate and the solvent is distilled off. There are obtained 550 grams of the 2,3-thioethyl-ether of n-propanol as a colourless slightly watersoluble liquid, boiling at 10 mm. Hg at 126–127° C. The yield is 67% of Th.

Example 2

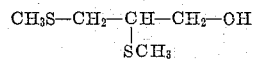

270 grams pulverized unhydrous potassium methyl-mercaptide are suspended in 1300 ml. dry benzene and at 70–80° C. there are added while stirring 327 grams 2,3-dibromo-propanol dissolved in 250 ml. dry benzene. Heating is continued for two hours at the same temperature and then the reaction mixture is cooled down to room temperature. The reaction product then is washed twice with water and subsequently dried over anhydrous sodium-sulfate.

After working up as described in the foregoing example there are obtained 194 grams of the 2,3-thiomethyl-ether of n-propanol as a waterunsoluble colourless oil distilling at 11 mm. Hg at 120–121° C. Yield is 85% of Th.

With an excess of thionyl-chloride the corresponding 2,3-dimethyl mercapto-1-chloropropane

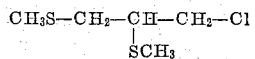

is obtained in an almost quantitative yield. (B.P. $12_{mm}$ 112° C.)

Example 3

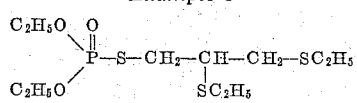

47 grams ammonium salt of O,O-diethyl-thiolphosphoric acid are dissolved in 150 ml. acetonitril. At 70° C. there are added while stirring 50 grams 2,3-ethylmercapto-1-chloropropane (B.P. 12 mm./118° C.). Heating is continued for one hour to said above mentioned temperature. Then the reaction mixture is cooled and poured into 300 ml. icewater. The reaction product is taken up with 200 ml. benzene, washed thoroughly with water and then dried over unhydrous sodium sulfate. After fractionating there are obtained 46 grams of the new ester distilling at 0.01 mm./114° C. Yield 56% of the Th. The ester is a colourless oil in water hardly soluble. It kills spider mites at 0.01 percent concentration (ovicidal action) and aphids at 0.01 percent concentration (system. action 0.1%).

Example 4

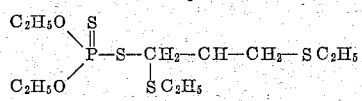

56 grams ammonium salt of diethyl-thionothiolphosphoric acid are dissolved in 150 ml. acetonitrile. At 75° there are added while stirring 50 grams 2,3-ethylmercapto-1-chloropropane. The mixture is kept for one hour at 75° C. and then worked up as described in Example No. 3. There are obtained 62 grams of the new ester distilling at 0.01 mm./113° C. Yield 71% of the Th. The ester is a colourless waterunsoluble oil. The ester shows a medium toxicity on rats per os (LD 50) of 5 mg./kg. It kills spider mites at a concentration of 0.001% (ovicidal action) and aphids at 0.01% (syst. action 0.1%).

Example 5

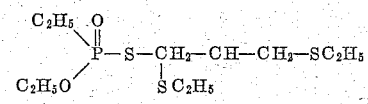

43 grams ammonium salt of O-ethyl ethyl-thiol-phosphonic acid are dissolved in 100 ml. acetonitrile. At 70–75° C. there are added while stirring 2,3-ethylmercapto-1-chloropropane. The mixture is kept at 75–80° C. for one hour and then worked up as described in Example No. 3. In this manner there are obtained 49 grams of the new ester distilling at 0.01 mm./110° C. Yield 62% of the Th. The ester is a colourless waterunsoluble oil and kills spider mites at a concentration of 0.001% (ovicidal action) and aphids at 0.001% (system. action 0.1%).

Example 6

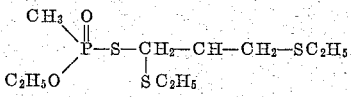

40 grams ammonium salt of O-ethyl methyl-thio-phosphonic acid are dissolved in 100 ml. acetonitrile. At 75° C. there are added while stirring 50 grams 2,3-ethylmercapto-1-chloropropane. The mixture is kept at 75–80° C. for one hour and then worked up as described in Example No. 3. In this manner there are obtained 48 grams of the new ester distilling at 0.01 mm./108°. Yield 64% of the Th. The ester is a colourless waterunsoluble oil and kills spider mites at a concentration of 0.001% (ovicidal action) and aphids at 0.001%. (system. action 0.1%).

Example 7

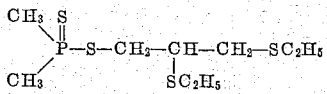

41 grams potassium salt of dimethyl-thionothiol-phosphinic acid are dissolved in 150 ml. acetonitrile. At 75° C. there are added while stirring 50 grams 2,3-ethylmercapto-1-chloropropane. The mixture is kept at 75° C. for one hour and then worked up as described in Example No. 3. In this manner there are obtained 42 grams of the new ester distilling at 0.01 mm./104°. Yield 58% of the Th. The new ester is waterunsoluble and kills spider mites at a concentration of 0.01%, ovicidal action) and aphids at 0.01% (system. action 0.1%).

Example 8

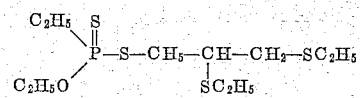

52 grams potassium salt of O-ethyl ethyl-dithio-phosphonic acid are dissolved in 150 ml. acetonitrile. At 75° there are added while stirring 50 grams 2,3-ethylmercapto-1-chloropropane. The mixture is kept at 75° C. for one hour and then worked up in the usual manner. There are obtained 50 grams of the new ester distilling at 0.01 mm./

110°. Yield 61% of the Th. The ester is a colourless waterunsoluble oil. Medium toxicity (LD 50/rat per os 5 mg./kg. The ester kills spider mites at a concentration of 0.001% (ovicidal action) and aphids at 0.001%. (system. action 0.1%).

*Example 9*

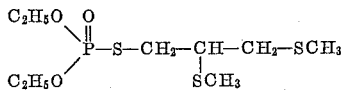

47 grams salt of diethyl-thiolphosphoric acid are dissolved in 200 ml. acetonitrile. While stirring there are added 43 grams 2,3-methylmercapto-1 - chloropropane. (B.P. 7 mm./102° C.) The mixture is kept at 75° C. for two hours and then worked up as described in Example No. 3. In this manner there are obtained 48 grams of the new ester as a colourless waterunsoluble oil. Even in high vacuum the ester is only distillable under decomposition. It kills spider mites at a concentration of 0.01% (ovicidal action) and aphids at 0.001% (system. action 0.1%).

By exactly the same way there may be obtained the following compounds:

(1)

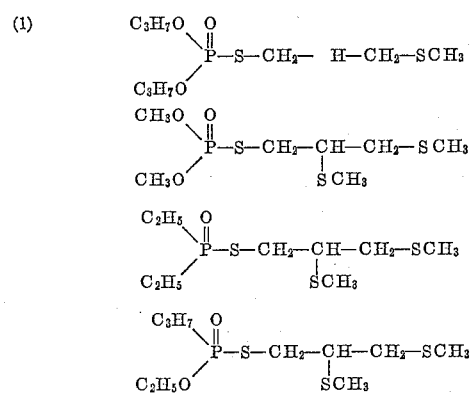

*Example 10*

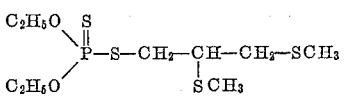

51 grams ammonium salt of diethyl-thionothiol-phosphoric acid are dissolved in 200 ml. acetonitrile. At 75° C. 43 grams 2,3-methylmercapto-1-chloropropane are added while stirring. For two hours the mixture is kept at 80° C. and then worked up as described in Example No. 3. In this manner 59 grams of the new compound are obtained as a colourless waterunsoluble oil. Yield 74% of the Th. The ester kills spider mites at a concentration of 0.01% (ovicidal action) and aphids at 0.01%. (system. action 0.1%). The ester is not distillable, even in high vacuum.

*Example 11*

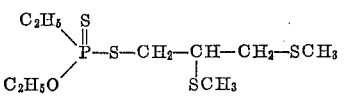

52 grams potassium salt of O-ethyl ethyl-thiono-thiol-phosphonic acid are dissolved in 150 ml. acetonitrile. At 75° there are added while stirring 43 grams 2,3-methylmercapto-1-chloropropane. The mixture is kept at 75–80° C. for a further hour and then worked up in the usual way. There are obtained 52 grams of the new compound distilling at 0.01 mm./112° as a waterunsoluble colourless oil. Yield 69% of the Th. The ester kills spider mites at a concentration of 0.001% (ovicidal action). Aphids are killed at a concentration of 0.001% and caterpillars at 0.1%.

*Example 12*

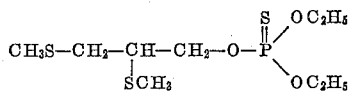

46 grams (³/₁₀ mol) of 2,3-bis-methylmercapto-propanol (B.P. 120° C./11 mm. Hg) are dissolved in 26 grams of anhydrous pyridine. 57 grams (³/₁₀ mol) of diethyl-thionophosphoric acid monochloride are added dropwise while stirring at 35–40° C. The mixture is heated at 40° C. for a further two hours and then stirred at room temperature for 5–6 hours. The reaction product becomes fairly consistent by the separated hydrochloric acid pyridine. 300 ml. of benzene are stirred into the material which is washed several times with 100 ml. of ice water and then dried over sodium sulphate. After distilling off the solvent, 70 g. of the new ester are obtained as a pale yellow oil which is distillable only with decomposition even in a vacuum and not soluble in water. Yield: 76% of the theoretical.

On rats per os the new ester shows a toxicity of 10 mg./kg. The ester kills aphids and spider mites at a concentration of 0.01% (ovicidal action). (System. action 0.1%.)

*Example 13*

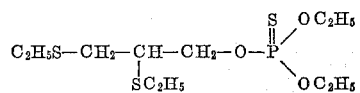

54 g. of 2,3-bis-ethylmercapto-propanol (B.P. 126° C./10 mm. Hg) are dissolved in 26 g. of pyridine. 57 g. (³/₁₀ mol) of diethyl-thionophosphoric acid chloride are added while stirring at 35–40° C. The mixture is heated at 40° C. for a further 2 hours and then after-stirred at room temperature for 12 hours. The precipitated hydrochloric acid pyridine renders the reaction product highly viscous. 300 ml. of benzene are stirred into the product which is washed three times with 100 ml.-portions of ice-water, dried over sodium sulphate, and the solvent is removed under vacuum. 53 g. of the new ester are thus obtained as a yellow water-insoluble oil which is not distillable without decomposition even under a high vacuum. Yield: 54% of the theoretical.

Toxicity on rats per os: 10 mg./kg. Aphids are completely killed at a concentration of 0.01% and they are 50% killed at a concentration of 0.001% (ovicidal action) (system. action 0.1%).

*Example 14*

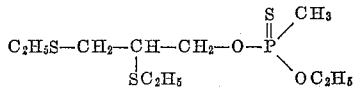

90 g. (0.5 mol) of 2,3-bis-ethylmercapto-propanol are dissolved in a sodium methylate solution containing ½ mol of dissolved sodium. Benzene is added and the methyl alcohol and benzene are distilled off azeotropically. The residual sodium salt is taken up with 500 ml. of methyl ethyl ketone: 80 g. of methyl-thionophosphonic acid-O-ethyl ester chloride (B.P. 60° C./12 mm. Hg) are added dropwise while stirring at 50–60° C. The reaction product is kept at 60° C. for 2 hours and then taken up with 50° ml. of benzene. The benzenic solution is washed several times with 100 ml. portions of water. The benzenic solution is then dried and fractionated in vacuum. 80 g. of the new ester of B.P. 102° C./0.01 mm. Hg are thus obtained. Yield: 52% of the theoretical. Flies are killed at a concentration of 0.001%, aphids at 0.01%, spider mites at 0.01% and caterpillars at 0.1% (system. action 0.1%).

*Example 15*

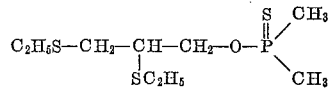

90 g. (0.5 mol) of 2,3-bis-ethylmercapto-propanol are dissolved in a sodium ethylate solution containing ½ mol of dissolved sodium. The ethyl alcohol and benzene are distilled off azeotropically with the addition of benzene. The resulting sodium salt is taken up with 500 ml. of methyl ethyl ketone. 65 g. of dimethyl-thiono-phosphinic acid chloride (B.P. 46° C./1 mm. Hg) are added dropwise while stirring at 60° C. The mixture is heated at 50–55° C. for 2 hours and then worked up in conventional manner. 45 g. of the new ester are thus obtained as a colourless oil which distils over at 92° C. under a pressure of 0.01 mm. Hg. Yield: 42% of the theoretical.

We claim:

1. A compound of the formula

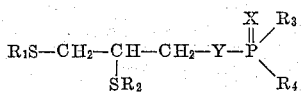

wherein $R_1$ and $R_2$ individually stand for lower alkyl having up to 4 carbon atoms, $R_3$ stands for a member selected from the group consisting of lower alkyl having up to 4 carbon atoms and lower alkoxy having up to 4 carbon atoms, $R_4$ stands for lower alkyl having up to 4 carbon atoms and X and Y stand for a chalkogen of an atomic weight less than 40, at least one of them being sulfur.

2. The compound of claim 1 wherein X is oxygen, Y is sulfur and $R_3$ is lower alkoxy.
3. The compound of claim 1 wherein X and Y are sulfur and $R_3$ is lower alkyl.
4. The compound of claim 1 wherein X is sulfur, Y is oxygen and $R_3$ is lower alkyl.
5. The compound of claim 1 wherein X and Y are sulfur and $R_3$ is lower alkoxy.
6. The compound of claim 1 wherein X is sulfur, Y is oxygen and $R_3$ is lower alkoxy.
7. The compound of the following formula

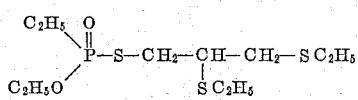

8. The compound of the following formula

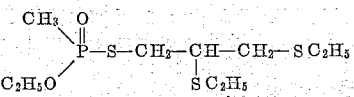

9. The compound of the following formula

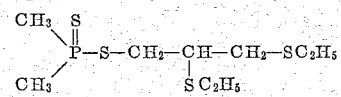

10. The compound of the following formula

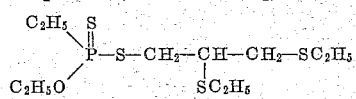

11. The compound of the following formula

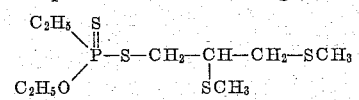

12. The compound of the following formula

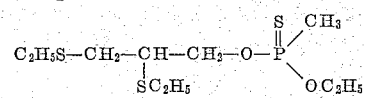

13. The compound of the following formula

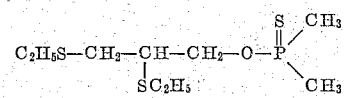

References Cited by the Examiner

UNITED STATES PATENTS

| | | | |
|---|---|---|---|
| 2,777,792 | 1/57 | Lutz et al. | 260—461 |
| 2,864,741 | 12/58 | Diveley | 260—461 |
| 2,944,933 | 7/60 | Sallmann | 260—461 |
| 2,956,074 | 10/60 | Dorken et al. | 260—461 |
| 2,959,516 | 11/60 | Sallimann | 260—461 |

CHARLES B. PARKER, *Primary Examiner.*

ABRAHAM H. WINKELSTEIN, LEWIS GOTTS, JOSEPH P. BRUST, *Examiners.*